Nov. 5, 1963
L. H. HOSBEIN ET AL
3,109,702
METHOD OF CO-MOULDING BRICK
Filed Sept. 21, 1960
2 Sheets-Sheet 1
FIG. 1
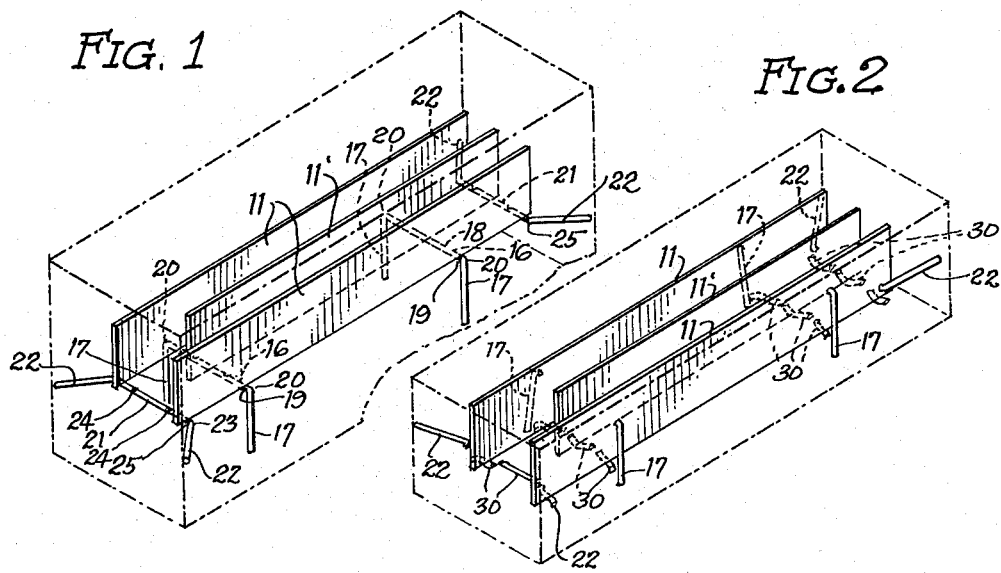
FIG. 2
FIG. 3
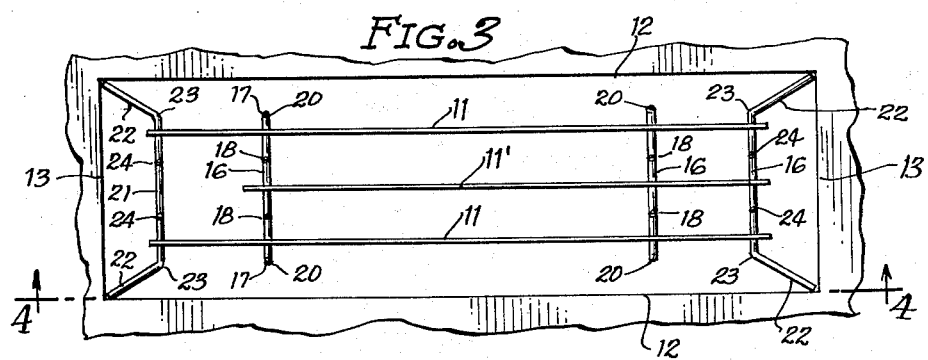
FIG. 4
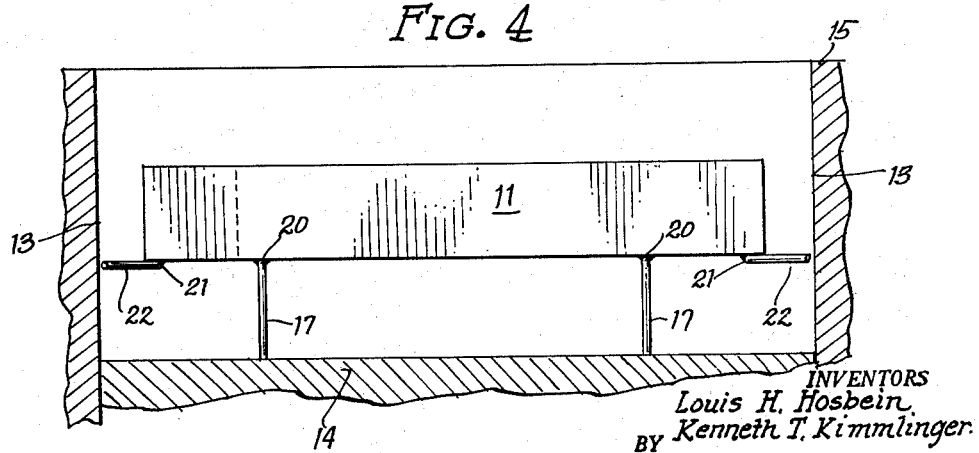
INVENTORS
Louis H. Hosbein
Kenneth T. Kimmlinger
BY
Zabel, Baker, York, Jones & Dithmar
Attorneys

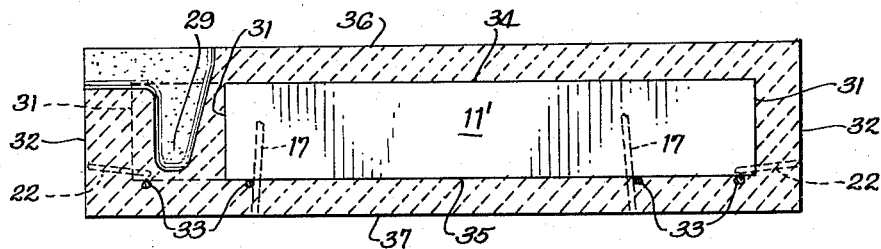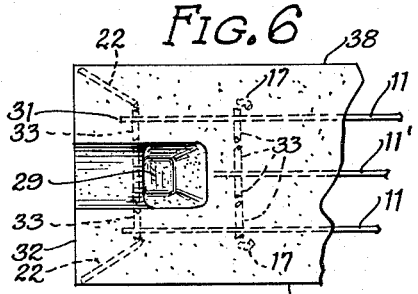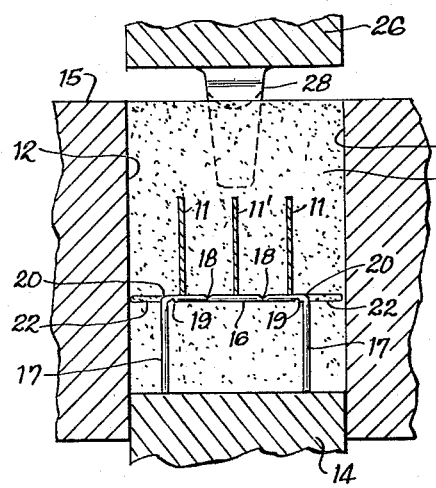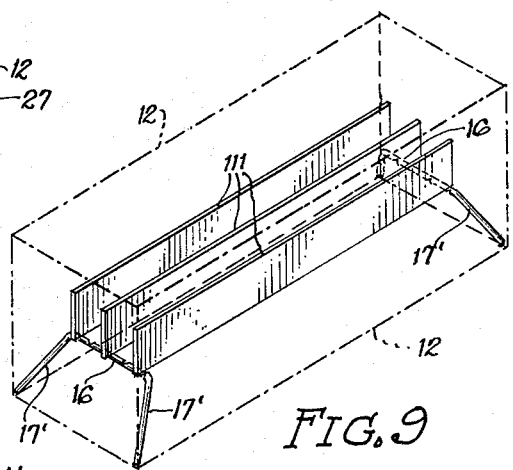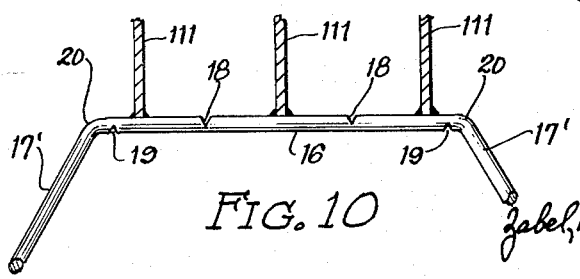

United States Patent Office 3,109,702
Patented Nov. 5, 1963

3,109,702
METHOD OF CO-MOULDING BRICK
Louis H. Hosbein, Glencoe, and Kenneth T. Kimmlinger, Skokie, Ill., assignors to M. H. Detrick Company, Chicago, Ill., a corporation of Delaware
Filed Sept. 21, 1960, Ser. No. 57,545
5 Claims. (Cl. 18—59)

Our invention relates to a method of co-moulding brick, that is, to a method of co-moulding a basic refractory material and metal members into a brick. Our method is an improvement over the method disclosed in the application of Louis H. Hosbein, Serial No. 638,148, filed February 4, 1957, and now abandoned.

In making brick that comprises basic refractory material and metal, it has been found highly desirable to provide for the even distribution of the metal in the body of the brick and to avoid the exposure of the metal on the surface of the brick. Furthermore it has been found highly desirable to distribute the metal in the brick in a uniform manner throughout the body of the brick. The uniform and even distribution of the metal in the brick has been found to reduce the tendency of the brick to crack along certain lines upon being heated to furnace temperature, which cracking has been found to be caused, at least in part, by uneven distribution of metal in the body of the brick.

It has been further found to be desirable in moulding a brick of the above referred to character, in the usual machine provided for moulding such brick, that plate-like or ribbon-like metal members be used for the metal in the brick, which are located in a position such that the same extend longitudinally of the mould and perpendicularly to the direction of movement of the plungers that act to compress the refractory material in the brick. The metal used in a brick of this character must be oxidizable readily under the heat of the furnace in order to combine with the refractory material of the brick to provide a strong structure for the wall or roof in which the brick is utilized. By avoiding exposure on the sides of the brick of the metal members that are inserted in the body of the brick it is possible to provide a tighter wall or roof in building the structure in which the bricks are used.

It is accordingly a purnpose of our invention to provide means for mounting metal plate-like or ribbon-like members in a mould for a brick of the above mentioned character in such a manner that said ribbon-like or plate-like members are spaced from the top, bottom and sides of the brick in the mould when the compressing operation on the refractory material in the mould is completed. This makes it necessary to provide means for spacing the metal members that are to be incorporated in the brick from the side walls of the mould and from the bottom plunger of the mould, as the filling of the mould proceeds with the refractory material, and to continue this holding of the metal members in this position until the mould is filled completely with the amount of refractory material required to form the brick. The mounting of the metal members in the mould must be in such a position that when the mould is filled the refractory material will extend above the top edges of the plate-like or ribbon-like members, so that when the refractory material is compressed by the plungers there will be refractory material between both the top and bottom plungers and the metal inserted in the mould.

In order to accomplish this it is necessary that the holding means be of such a character that it will be released as soon as the compressing operation begins so that the bottom plunger will not move the plate-like or ribbon-like members upwardly in the mould out of the position originally assumed thereby. By mounting said metal members midway between the top and bottom of the mould cavity all movement of the refractory material during the compressing action of the plungers is toward the longitudinal middle of said metal members, from the opposed longitudinal edges thereof. In order that the metal members be properly spaced from each other and from the sides of the mould, means is provided for holding the same away from the sides of the mould and from each other in a definite fixed position during the mould filling operation.

In order to get the even distribution of the metal throughout the mass of the refractory material in the moulded brick, it is highly desirable to maintain said plate-like or ribbon-like members in parallel relationship throughout the moulding operation so that these plate-like or ribbon-like members will remain in such parallel relationship in the finished brick. It has been found that while it is highly desirable to maintain the plate-like or ribbon-like members in spaced relation from the sides and bottom of the mould and in predetermined spaced relation to each other during the filling operation, that if the means for holding the same in this position are not released during the compressing operation, there will be warping or distortion of the plate-like or ribbon-like members out of their parallel relationship. In order to avoid this, frangible or disruptable means is provided for spacing the plate-like or ribbon-like members from the sides and bottom of the mould and from each other so that as soon as any appreciable pressure is applied thereto the same will rupture and release the plate-like or ribbon-like members from each other and from the sides and bottom of the mould so that the movement of the refractory material under pressure will not cause any movement of the plate-like or ribbon-like members out of their parallel relationship due to the action of the spacing means thereon during the compressing operation.

It is a purpose of our invention to provide means for holding the plate-like or ribbon-like members in position in a mould by means of wire spacing members, which wires are secured to the plate-like members and are of a hardened character so that if the same are provided with weakened portions, these weakened portions will readily rupture in order that the spacing wires will separate or rupture between the plates and between the bottom of the mould and sides of the mould and the plate-like or ribbon-like members.

It is particularly desirable, in the machine moulding of such refractory members, that it be possible to merely drop the metal members with their spacing means into the mould during the operation of the machine, when the plungers have been retracted and the mould cavity is empty. While a slight endwise movement can be utilized in the insertion of the metal insert thus provided during the inserting operation in order to locate it lengthwise of the mould, by engaging the ends of certain of the metal members with the end walls of the mould, preferably such endwise movement of the metal insert after being placed in the mould is to be avoided so as to avoid any possibility of injury to the operator of the machine by the mechanism, should he take too much time in locating the metal insert in the mould.

It accordingly is another purpose of our invention to provide a metal insert, of the above referred to character, with spacing means that is of such a character that it will space the metal members both from the end walls and the side walls of the mould, so that all that is necessary is to drop the insert into the mould, this result being obtained by providing diagonally or obliquely extending spacing members, extending from certain of the plate-like or ribbon-like metal members toward the corners of the mould, said obliquely extending spacing members being of the same character as the other above referred to spacing members and provided with weakened portions for the same purpose as above referred to.

More specifically our invention comprises the method of co-moulding basic refractory material with a plurality of elongated metal members to produce a basic brick having the metal members running lengthwise of the completed brick in inwardly spaced relation to the side faces thereof, or to the side faces and end faces thereof, which comprises supporting the metal members in an empty mould cavity in spaced relation to the bottom and sides, or to the sides and ends, of the mould cavity by disruptable means, filling the mould cavity with the refractory material required for the brick while continuing to support the metal members in this position by said disruptable means and then rupturing the supporting means and compressing the refractory material to final brick size.

Still more specifically, our invention comprises the method of co-moulding basic refractory material and flat plate-like or ribbon-like metal members running lengthwise of the completed brick in the position above referred to, which comprises supporting the metal members in an empty mould cavity in spaced relation to the bottom and sides, or sides and ends, of the mould cavity and in spaced relation to each other in parallelism to the sides of the mould by disruptable members, such as wires having weakened portions secured to the plate-like or ribbon-like members and extending between them and sides, or sides and ends, and the bottom of the mould, filling the mould cavity with all the refractory material required for the brick while so supporting said plate-like or ribbon-like metal members by said disruptable members, and rupturing said disruptable members and compressing said refractory material to final brick size.

Other objects and advantages of our invention will appear as the description of the drawings proceeds. We desire to have it understood, however, that we do not intend to limit ourselves to the particular details shown or described, except as defined by the claims.

In the drawings:

FIG. 1 is a perspective view of the metallic insert comprising the plate-like or ribbon-like members and the preferred form of spacing members associated therewith prior to rupture thereof, the outline of the mould cavity being shown in dotted lines.

FIG. 2 is a similar view diagrammatically showing the spacing of the ruptured spacing members after the refractory material has been compressed.

FIG. 3 is a top plan fragmentary view of the mould, showing the mould cavity and the position of the metal insert therein.

FIG. 4 is a vertical longitudinal sectional view through the mould, portions thereof being broken away, the section being taken substantially on the line 4—4 of FIG. 3.

FIG. 5 is a longitudinal section through the brick after the compressing operation has been completed and the brick removed from the mould.

FIG. 6 is a fragmentary top plan view of the brick shown in FIG. 5.

FIG. 7 is a transverse sectional view through the mould, showing the same after the metal insert has been placed therein and the mould cavity filled with the refractory material.

FIG. 8 is a similar view, showing the position of the parts after the compressing of the refractory material has been completed.

FIG. 9 is a view similar to FIG. 1 of a modification, and

FIG. 10 is a fragmentary view partly in transverse section and partly in elevation of the form of the invention shown in FIG. 9, on an enlarged scale.

Referring in detail, the drawings, in FIGS. 1 to 3, 4 and FIG. 7, the metal insert is shown in the condition in which it is placed in the mould, and preferably comprises a pair of outer longitudinal plate-like or ribbon-like members 11 and a slightly shorter central plate-like or ribbon-like member 11'. Said plate-like members 11 and 11' are to be located in the finished brick in parallel relationship in uniformly spaced relation to each other, and are preferably spaced so that the plate-like or ribbon-like members 11 are spaced the same distance from the side walls of the mould cavity as the central plate-like or ribbon-like member 11' is spaced from the adjacent members 11. The mould is provided with side walls 12 and end walls 13 and has its bottom wall formed by means of a plunger 14, which is slidable between the end walls 13 and side walls 12. It is desirable to locate the ribbon-like members 11 and 11' so that the same are located midway between the plunger 14 and the top 15 of the mold cavity provided between the walls 12 and 13 and the plunger 14. This is desirable because it has been found that the movement of the material is from the top 15 and the plunger 14 toward the vertical middle of the mould, and by locating the ribbon-like metal members so that the middle of said ribbon-like members is located in this vertical middle plane of the mould cavity, the movement of the material between the members 11 and 11' during the compressing action will be entirely toward this mid-line with no movement at the longitudinal middle of the plates at all. This is desirable, as, in that way, the forces applied to the plates are such that they are not moved out of the position that they have been placed in prior to the compression of the refractory material in the mould.

In order to accomplish this location of the plate-like members with respect to the side walls and end walls of the mould and the plunger 14, frangible or disruptable members are provided for holding the plate-like members spaced from the ends and sides of the mould and from each other, as well as from the plunger 14. Said means preferably comprises a pair of wire spacing members having transverse portions 16, which are secured to the bottom longitudinal edges of the ribbon-like metal members 11 and 11' by welding, and which have downturned end portions 17 that form legs that engage with the top surface of the plunger 14. Said wire spacing members are made of a hard wire that is somewhat brittle so that it will readily break under a bending stress. In order to facilitate such breaking, notches 18 are provided in the transverse portion 16 of said wire members between the ribbon-like member 11' and the members 11, these notches being in the upper side of the transverse portion 16, and notches 19 are provided between the ribbon-like members 11 and the bends 20 in said wires connecting the transverse portion 16 with the legs 17. The notches 19 are on the underside of the transverse portion 16 of these wires.

In order to space the plate-like members, secured in spaced relation to each other by means of the transverse portion 16, in spaced relation to the sides 12 and ends 13 of the mould, and to further provide spacing means connecting said members 11 and 11', the wires having the transverse portions 21 are provided, which are engaged with the bottom edges of the ribbon-like members 11 and 11' in the manner shown in FIGS, 1, 3, 4 and 7. The same kind of wire is used for these wire members as for the previously described wire members that have the legs 17, and said wire members are welded to the bottom edges of the plates 11 and 11' where the transverse portions 21 thereof intersect the same. Said wire members are further provided with obliquely or diagonally extending portions 22, that extend toward the corners of the mould where the ends 13 and sides 12 thereof meet, being of such length as to fit loosely between the end walls 13 and the side walls 12. Said transverse portions 21 and obliquely extending portions 22 are connected by means of bends 23. Notches 24 are provided in the top sides of the transverse portions 21 to provide weakened places therein, and notches 25 are provided between the bends 23 and the ribbon-like members 11 on the under sides of the transverse portions 21 adjacent said bends 23.

In the use of the metal insert shown in FIGS. 1, 3, 4 and 7, the insert is merely dropped into the mould with the leg portions 17 downwardly, after the plunger 14 has been retracted and the mould is empty. The plate-like or ribbon-like members 11 and 11′ are then in the position that it is desired to have the same in the finished brick after the plunger 14 and the upper plunger 26 have acted on the contents of the mould cavity. With the metal insert in the position shown in FIGS. 3 and 4 in the empty mould, the mould is filled to the top 15 thereof with the refractory material 27, that is to form the body portion of the brick. After the mould cavity has been entirely filled with said refractory material the plungers 14 and 26 are moved toward each other, and as soon as the plunger 26 enters the mould cavity compression of the refractory material commences. It will be noted that the plunger 26 is provided with a projection 28, which is usually provided on a plunger of this character for forming a hanger recess 29 in the finished brick, which is shown in FIG. 5. In order that this projection 28 will enter the refractory material without interference on the part of the metal to be co-moulded with the brick, the inner plate-like or ribbon-like member 11′ is made shorter than the members 11 at one end of the insert so that the recess forming projection 28 will avoid the same.

When the compression of the refractory material 27 by means of the plungers 14 and 26 begins, the legs 17 will tend to be moved upwardly by the plunger 14, but due to the resistance of the refractory material 27 to such movement, the legs 17 will be separated from the transverse portions 16 by rupture at the notches 19 and will be carried upwardly with the plunger 14 without any appreciable movement of the remaining metal structure, such as the plate-like or ribbon-like members 11 and 11′. As movement of the plungers 26 and 14 toward each other in the mould cavity continues, the pressure on the horizontally extending portions 16, 21 and 22 of the wire members will gradually increase, and due to the weakened portions 18, 24 and 25, said wire members will rupture at these weakened portions freeing the plate-like or ribbon-like members 11 and 11′ from each other and from the walls of the mould. Due to the character of the wire used and the weakened portions provided therein, this rupture of the wires and breaking of the connections between the plate-like members will take place before sufficient force has been exerted by the compression of the refractory material on the horizontally extending portions of the wires to cause any tilting or warping of the plate-like members out of parallel relationship to each other and to the side walls of the mould and thus in perpendicular relationship to the faces of the plungers 14 and 26.

As the wires that connect the plate-like members with each other and space them from the side walls and end walls of the mould are located below the vertical middle of the mould, there will be some movement of the broken off portions of the wire members with the refractory material in an upward direction in the mould, which will result in the wire sections that remain being bent somewhat upwardly at the ends thereof remote from the plate-like members, in the case of the transverse portions 16 and 21, as shown at 30 in FIGS. 2 and 8, the free ends, constituting the leg portions 17, and the obliquely extending portions 22 assuming substantially the position shown in FIGS. 2 and 8 as the plungers 14 and 26 reach their final position for completing the compression of the refractory material 27 as shown in FIG. 8.

The finished brick is shown in FIGS. 5 and 6 and it will be seen that the ends 31 of all the ribbon-like or plate-like members 11 and 11′ are spaced from the ends 32 of the body portion of the brick with the wire legs 17 embedded in the brick in substantially the position shown, as are also the obliquely extending portions 22 and the fragments of the connecting portions 16 and 21, which are designated by the numeral 33 in FIGS. 5 and 6. It will also be noted upon reference to FIG. 5 that the top and bottom longitudinal edges 34 and 35 of said ribbon-like or plate-like members are spaced inwardly substantially the same distance from the side face 36 and the side face 37 of the brick, these being the wide side faces of the brick which were uppermost and lowermost in the mould, but which would ordinarily be vertical side faces when the brick is hung from the hanger that extends into the cavity or socket 29. Also, upon reference to FIG. 6, it will be noted that the plate-like members 11 and 11′ are spaced substantially the same distance from each other as the plate-like members 11 are spaced from the sides 38 and 39 of the brick, which are the narrow longitudinal side faces thereof, which constituted the vertical side faces during the moulding operation.

Due to the position of the plate-like members 11 and 11′ in the mould during the compressing operation, the movement of the refractory material 27 will be from the plungers 14 and 26 parallel to the faces of the plate-like members 11 and 11′ toward the longitudinal middle of these faces, and inspection of said ribbon-like or plate-like members after the compressing operation has been completed, shows there is substantially no movement of the refractory material whatsoever along said faces at the center line thereof. Since the wire connecting members or spacing members are ruptured at substantially the beginning of the compressing operation, these do not in any manner interfere with the compression of the refractory material nor does the compression of the refractory material in any manner affect the position or shape of the plate-like members 11 and 11′, as the compression of the refractory material is parallel to the faces of said plate-like members and the forces acting thereon are principally parallel to said faces, with no connections between the plate-like members extending transversely to the direction of movement of the material under compression, which would exert torsional forces on the plate-like or ribbon-like members.

In FIG. 9 a modified form of metallic insert is shown, in which the plate-like members 111 are all shown as being of equal length, as no hanger recess is to be provided in this brick. Only one pair of wire spacing members is provided in this form of the invention, said spacing members having the transversely extending portions 16 having the notches 18 therein and having obliquely extending ends providing the leg portions 17′ connected with the portions 16 by means of the bends 20 and having the notches 19 therein for the same purpose as previously described, said transverse portions 16 being welded to the plate-like or ribbon-like members 111. However, instead of providing the members having the diagonally extending end portions 22, the legs 17′ extend obliquely both transversely and vertically of the mould so as to space the metal plates 111 not only from the bottom plunger 14 but also from the side and end walls of the mould.

Thus the insert shown in FIGS. 9 and 10 will be spaced from the side and end walls and the bottom plunger by engagement of the ends of the legs 17′ with the end corners of the mould at the top face of the plunger 14. The operation of the insert shown in FIGS. 9 and 10 is the same as that shown in FIGS. 1 to 8 inclusive, and the compression of the refractory material will cause the rupture of the wire members at the notches provided therein, in the same manner as previously described, so as to freely mount the plate-like or ribbon-like members 111 in the body of refractory material as it is being compressed, it being, of course, to be understood that the metal insert is first placed in the mould cavity, after which it is filled completely with the refractory material in the same manner as has been described in connection with FIGS. 1 to 8, before the plungers are actuated to compress the said refractory material and while the members 111 are held in position midway between the top and bottom of the mould cavity and in the desired spaced relation to each other and to the side and end walls of the mould cavity.

What we claim is:

1. The method of co-moulding basic refractory material with a plurality of elongated plate-like metal members to produce a basic brick having said members running lengthwise of the completed brick independently of each other in inwardly spaced relation to the sides of said brick and in laterally spaced substantially parallel relation to each other, comprising locating plate-like metal members of less length than the length of a mould cavity and of less width than the depth of said mould cavity in said mould cavity in spaced relation to the top and bottom thereof, holding said metal members in laterally spaced parallel relation to each other by rigid disruptable members spaced from each other lengthwise of said metal members and in parallel spaced relation to the sides of said mould cavity by rigid disruptable members spaced from each other lengthwise of said metal members, filling said mould cavity with basic refractory material to the top thereof and rupturing the disruptable members spacing said metal members from each other and from the sides of said mould cavity by the pressure of said refractory material thereagainst while compressing the refractory material to final brick size.

2. The method of co-moulding basic refractory material with a plurality of elongated plate-like metal members to produce a basic brick having said members running lengthwise of the completed brick independently of each other in inwardly spaced relation to the sides and ends of said brick and in laterally spaced substantially parallel relation to each other, comprising locating plate-like metal members of less length than the length of a mould cavity and of less width than the depth of said mould cavity in said mould cavity in spaced relation to the top and bottom thereof, holding said metal members in laterally spaced parallel relation to each other by rigid disruptable members spaced from each other lengthwise of said metal members and in spaced relation to the ends and parallel spaced relation to the sides of said mould cavity by rigid disruptable members spaced from each other lengthwise of said metal members, filling said mould cavity with basic refractory material to the top thereof and rupturing the disruptable members spacing said metal members from each other and from the sides and ends of said mould cavity by the pressure of said refractory material thereagainst while compressing the refractory material to final brick size.

3. The method of co-moulding basic refractory material with a plurality of elongated plate-like metal members to produce a basic brick having said members running lengthwise of the completed brick independently of each other in inwardly spaced relation to the sides of said brick and in laterally spaced substantially parallel relation to each other, comprising locating plate-like metal members of less length than the length of a mould cavity and of less width than the depth of said mould cavity in a mould, having top and bottom plungers movable toward each other, in spaced relation to the top and bottom of said cavity by rigid disruptable members spaced from each other lengthwise of said metal member and engaging said bottom plunger, holding said metal members in laterally spaced parallel relation to each other by rigid disruptable members spaced from each other lengthwise of said metal members and in parallel spaced relation to the sides of said mould cavity by rigid disruptable members spaced from each other lengthwise of said metal members, filling said mould cavity with basic refractory material to the top thereof and moving said plungers toward each other to rupture said bottom plunger engaging members and compress said refractory material to final brick size and rupture all the other disruptable members by the pressure of said refractory material thereagainst.

4. The method of co-moulding basic refractory material with a plurality of elongated plate-like metal members to produce a basic brick having said members running lengthwise of the completed brick independently of each other in inwardly spaced relation to the sides and ends of said brick and in laterally spaced substantially parallel relation to each other, comprising locating plate-like metal members of less length than the length of a mould cavity and of less width than the depth of said mould cavity in a mould, having top and bottom plungers movable toward each other, in spaced relation to the top and bottom of said cavity by rigid disruptable members spaced from each other lengthwise of said metal members and engaging said bottom plunger, holding said metal members in laterally spaced parallel relation to each other by rigid disruptable members spaced from each other lengthwise of said metal members and in spaced relation to the ends and parallel spaced relation to the sides of said mould cavity by rigid disruptable members spaced from each other lengthwise of said metal members, filling said mould cavity with basic refractory material to the top thereof and moving said plungers toward each other to rupture said bottom plunger engaging members and compress said refractory material to final brick size and rupture all the other disruptable members by the pressure of said refractory material thereagainst.

5. The method of co-moulding basic refractory material with a plurality of elongated plate-like metal members to produce a basic brick having said members running lengthwise of the completed brick independently of each other in inwardly spaced relation to the sides and ends of said brick and in laterally spaced substantially parallel relation to each other, comprising locating plate-like metal members of less length than the length of a mould cavity and of less width than the depth of said mould cavity in a mould, having top and bottom plungers movable toward each other, in spaced relation to the top, bottom, sides and ends of said cavity by rigid disruptable members spaced from each other lengthwise of said metal members and engaging said bottom plunger, holding said metal members in laterally spaced parallel relation to each other by rigid disruptable transverse members spaced from each other lengthwise of said metal members, filling said mould cavity with basic refractory material to the top thereof and moving said plungers toward each other to rupture said bottom plunger engaging members and compress said refractory material to final brick size and rupture said transverse disruptable members by the pressure of said refractory material thereagainst.

References Cited in the file of this patent

UNITED STATES PATENTS

| | | |
|---|---|---|
| 1,372,387 | Badger | Mar. 22, 1921 |
| 1,727,412 | Roberts | Sept. 10, 1929 |
| 1,735,127 | Oliver | Nov. 12, 1929 |
| 2,247,376 | Heuer | July 1, 1941 |
| 2,901,807 | Helmerson | Sept. 1, 1959 |
| 3,044,125 | Hosbein | July 17, 1962 |